2 Sheets--Sheet 1.

M. S. ANDREWS.
Soda Apparatus.

No. 135,617.   Patented Feb. 11, 1873.

Witnesses,   Inventor,

2 Sheets--Sheet 2.

M. S. ANDREWS.
Soda Apparatus.

No. 135,617. Patented Feb. 11, 1873.

Witnesses,

Inventor,
M. S. Andrews

UNITED STATES PATENT OFFICE.

MATTHEW S. ANDREWS, OF SOMERVILLE, ASSIGNOR TO JAMES W. TUFTS, OF MEDFORD, MASSACHUSETTS.

IMPROVEMENT IN SODA APPARATUS.

Specification forming part of Letters Patent No. 135,617, dated February 11, 1873.

*To all whom it may concern:*

Be it known that I, MATTHEW S. ANDREWS, of Somerville, in the county of Middlesex and State of Massachusetts, have invented certain Improvements in Soda Apparatus, of which the following is a full, clear, and exact description, reference being had to the accompanying drawing making part of this specification, in which—

Figure 1:
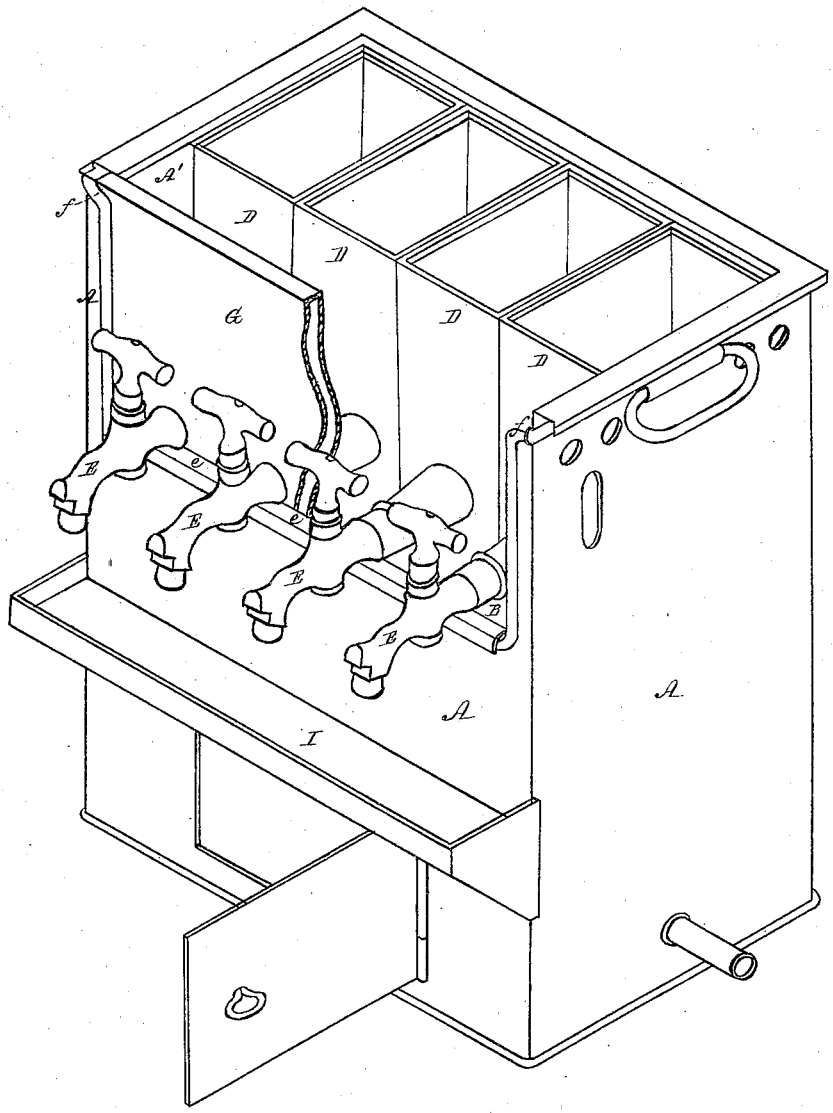
Figure 2:
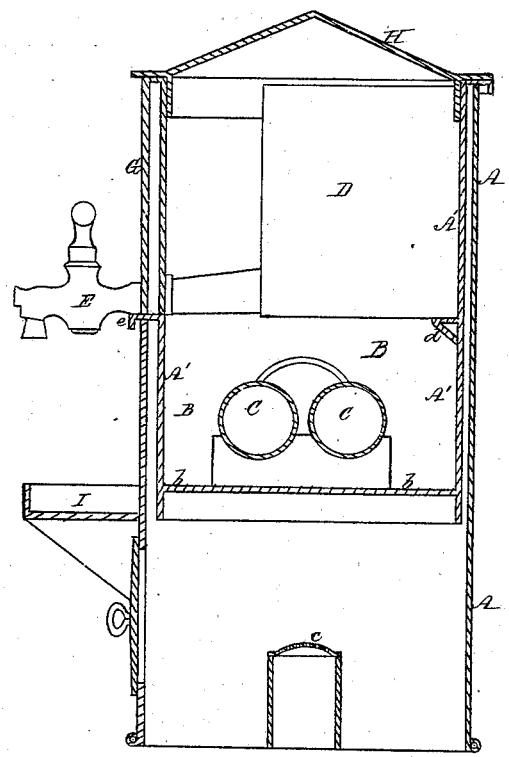
Figure 3:
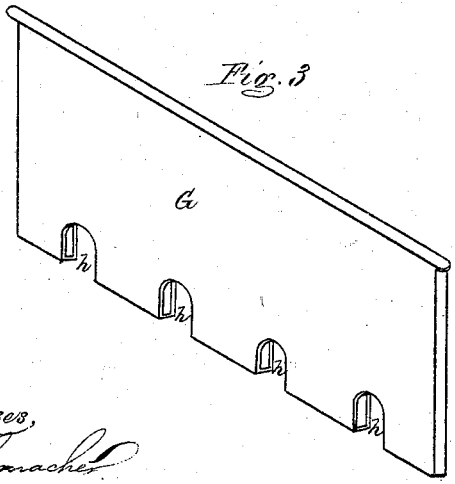

Figure 1 is a perspective view of a soda apparatus constructed in accordance with my invention. Fig. 2 is a transverse vertical section through the center of the same. Fig. 3 is a perspective view of the removable portion of the front of the casing.

Hot soda has heretofore been drawn from the ordinary soda apparatus, the soda and sirups having been heated by means of a gas-jet beneath the metal tank which contained water in which the heaters and sirup-cans were immersed. With this construction the sirup-cans are heated to such an extent as to cause their contents to boil and thicken, so that the cans and cocks connected therewith soon become clogged and inoperative, rendering it necessary to frequently remove and cleanse them, which operation, owing to the number of screw-couplings, is extremely inconvenient, and occasions much delay and expense. The steam and odors from the boiling sirups also escape from the top of the apparatus, which is not desirable. Furthermore, most of the larger class of apparatus cannot be adapted for hot soda, as their construction does not admit of heat being properly applied thereto. My invention has for its object to overcome these objections; and consists in a portable soda apparatus, in which a portion of the casing is made removable, and the sirup-cans so arranged that they can be readily taken out for cleaning without any uncoupling whatever, whereby I am enabled to avoid much inconvenience and effect a great saving of time, labor, and expense, while the sirup-cans are so placed as to be above the surface of the hot water, and are heated by the steam arising therefrom, thus preventing the boiling of the sirups, which, on account of the starch which they contain, soon become thickened by overheating.

To enable others skilled in the art to understand and use my invention, I will proceed to describe the manner in which I have carried it out.

In the said drawing, A represents the outer casing of the apparatus, which I prefer to make of metal. Within this casing is an inner casing, A', at the lower end of which is placed a tight bottom, *b*, whereby a tank or receptacle, B, is formed for containing water to be heated by a gas-jet from a burner, *c*, placed beneath the bottom *b*. Within this tank B are placed two cylinders or heaters, C C, through which the soda passes from the fountain to the draft-cock by means of pipes, not shown, and, as these cylinders are immersed in the hot water contained in the tank, the soda is heated in its passage through them, as required. D D are the sirup-cans, which are supported above the level of the hot water in the tank B, the rear end of each can resting on a edge, *d*, and the cock E or discharge-pipe connected therewith resting on the ledge *e* of the inner casing A'. Above the cocks E a portion, G, of the casing is made to slide in grooves *f* at the corners of the apparatus, so that it can readily be raised and removed when it is desired to take out the sirup-cans for cleansing or other purposes; and by thus arranging the cans D and making a portion of the casing removable, no unscrewing of couplings is required in order to take out the cans, as has heretofore been necessary, and much inconvenience, delay, and expense are thus avoided. The removable portion G of the casing is provided at its bottom with openings *h*, which fit over the necks of the cocks E, and allow the portion G to fit down snugly onto the edge *e*, as desired.

By supporting the sirup-cans above the level of the hot water within the tank B instead of immersing them therein, the boiling and consequent rapid evaporation and thickening of the sirups are avoided, the heat of the steam rising from the water in the tank B being sufficient to maintain the sirups at the desired temperature, and, consequently, the cans and cocks require to be less frequently cleaned than heretofore. Another advantage resulting from my improved construction is, that the cylinders or heaters C C do not require to be disturbed to allow of the removal of the sirup-cans; whereas, in the apparatus heretofore used, the heaters have been placed over the pipes connecting the cans with the cocks, and, consequently, required to be taken out, which caused additional labor and trouble.

At the top of the casing is a tight-fitting cover, H, which prevents the escape of odors or steam, which latter is condensed on the inside of the cover, and runs back into the tank. I is a shelf for containing the tumblers, which are kept warm by the heat radiated from the outside of the casing, and the liability of breakage is thus avoided.

Although the above-described apparatus is designed particularly for hot soda, yet it is evident that it may be used as a portable apparatus for cold soda, the tank B being used as a receptacle for ice for cooling the soda in the cylinders C C.

*Claim.*

What I claim as my invention, and desire to secure by Letters Patent, is—

The removable portion G, in combination with the cocks E and sirup-cans D, all constructed and arranged so the cans can be removed without unscrewing any coupling, substantially as described.

M. S. ANDREWS.

In presence of—
P. E. TESCHEMACHER,
W. J. CAMBRIDGE.